US 6,717,287 B2

United States Patent
Tengler et al.

(10) Patent No.: US 6,717,287 B2
(45) Date of Patent: Apr. 6, 2004

(54) INPUT/OUTPUT DEVICE FOR MOUNTING IN VEHICLE

(75) Inventors: Steven Christopher Tengler, Grosse Pointe Park, MI (US); John P. Weiss, Dearborn, MI (US); James Peter Foley, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 140 days.

(21) Appl. No.: 09/863,088

(22) Filed: May 22, 2001

(65) Prior Publication Data

US 2002/0175564 A1 Nov. 28, 2002

(51) Int. Cl.[7] .................................................. B60J 7/00
(52) U.S. Cl. ........................ 307/10.1; 701/36; 348/118; 345/156
(58) Field of Search ............................. 307/10.1; 701/1, 701/36; 180/286; 348/118; 345/156; 296/70

(56) References Cited

U.S. PATENT DOCUMENTS

| | | | | |
|---|---|---|---|---|
| 4,843,477 A | * | 6/1989 | Mizutani et al. ............ | 348/837 |
| 4,908,611 A | * | 3/1990 | Iino ............................. | 345/7 |
| 5,059,957 A | * | 10/1991 | Todoriki et al. ............ | 345/7 |
| 5,161,028 A | * | 11/1992 | Kawata et al. .............. | 348/837 |
| 5,173,686 A | * | 12/1992 | Fujihara ...................... | 345/87 |
| 5,404,443 A | * | 4/1995 | Hirata ......................... | 725/75 |
| 5,467,106 A | * | 11/1995 | Salomon ..................... | 345/87 |
| 5,732,368 A | | 3/1998 | Knoll et al. | |
| 5,757,359 A | | 5/1998 | Morimoto et al. | |
| 5,847,685 A | * | 12/1998 | Otsuki ........................ | 345/87 |
| 5,871,251 A | * | 2/1999 | Welling et al. ............ | 296/97.5 |
| 5,949,345 A | | 9/1999 | Beckert et al. | |
| 6,029,110 A | | 2/2000 | Zuber et al. | |
| 6,067,078 A | * | 5/2000 | Hartman ...................... | 345/168 |
| 6,181,996 B1 | * | 1/2001 | Chou et al. .................. | 701/36 |
| 6,186,459 B1 | * | 2/2001 | Ma ............................ | 348/276.1 |
| 6,199,810 B1 | * | 3/2001 | Wu et al. ................. | 248/291.1 |
| 6,256,558 B1 | * | 7/2001 | Sugiura et al. ............... | 701/1 |
| 6,272,407 B1 | * | 8/2001 | Scholl ......................... | 701/29 |
| 6,295,883 B1 | * | 10/2001 | Tsukada et al. ............. | 74/89.18 |
| 6,304,173 B2 | * | 10/2001 | Pala et al. ................... | 340/461 |
| 6,354,649 B1 | * | 3/2002 | Lee ............................... | 296/70 |
| 6,361,012 B1 | * | 3/2002 | Chang ......................... | 248/324 |
| 6,392,531 B1 | * | 5/2002 | Gabbard ..................... | 340/5.31 |
| 6,414,591 B1 | * | 7/2002 | Watanabe .................... | 340/438 |
| 6,415,224 B1 | * | 7/2002 | Wako et al. ................ | 701/208 |
| 6,448,893 B1 | * | 9/2002 | Dobberkau et al. ......... | 340/461 |
| 6,499,788 B2 | * | 12/2002 | Ito et al. ........................ | 296/70 |
| 6,526,335 B1 | * | 2/2003 | Treyz et al. ................... | 701/1 |
| 6,529,123 B1 | * | 3/2003 | Paul, Jr. .................... | 340/425.5 |

FOREIGN PATENT DOCUMENTS

| | | | | |
|---|---|---|---|---|
| DE | 4213129 A1 | * | 10/1993 | B60R/11/02 |
| JP | 04-224432 | * | 8/1992 | B60R/11/02 |
| JP | 2002-211327 | * | 7/2002 | B60R/11/02 |

* cited by examiner

Primary Examiner—Gregory J. Toatley, Jr.
Assistant Examiner—Roberto J. Rios
(74) Attorney, Agent, or Firm—Brinks Hofer Gilson & Lione

(57) ABSTRACT

The present invention provides apparatuses and methods for restricting the ability to input information into an input/output device mounted within a vehicle. In a preferred embodiment, an output of an input/output device is movable between first and second positions. When the output is in the second position, the input of the device is preferably enabled, allowing an occupant of the vehicle to enter information into the device. When the output is not in the second position, however, the input of the device is preferably disabled such that information cannot be entered into the device. The device preferably determines the position of the output relative to a driver and/or passenger seat of the vehicle to determine whether disablement of the input is appropriate.

15 Claims, 3 Drawing Sheets

INPUT/OUTPUT DEVICE FOR MOUNTING IN VEHICLE

FIELD OF THE INVENTION

The present invention relates to input/output devices mounted within vehicles. More specifically, the present invention relates to apparatuses and methods for restricting the ability of a vehicle occupant to input information into such devices.

BACKGROUND OF THE INVENTION

An increasing quantity and variety of input/output devices are being incorporated into modern motor vehicles. These devices offer functionality previously not available in standard automobiles, such as graphical display of street level mapping data and textual display of door-to-door driving directions. Regardless of function, these modern devices are typically capable of providing output that is customized for an occupant of the vehicle. Customization is accomplished by receiving and processing input from an occupant of the vehicle. For example, modern onboard navigational computers include input devices, such as keyboards or touch screens, that allow an occupant of the vehicle to specify an address or location to be mapped by the computer. Once the computer receives and processes the input, a map or other appropriate information is projected onto the display of the device.

SUMMARY OF THE INVENTION

The present invention provides apparatuses and methods for restricting the ability of a vehicle occupant to input information into an input/output device mounted within the vehicle. In one embodiment, the invention comprises a display screen that is movable between two positions. In the first position, the driver of the vehicle is able to view the screen and the information displayed on the screen. In the second position, however, the driver is unable to view the information displayed on the screen because the field of view of the screen is not within the driver's field of vision. The input/output device is preferably able to determine when the display is in the second position. Also preferable, a signal is generated when the display is in the second position. This signal can be utilized to control the ability to input information into the device.

In a preferred embodiment, the input/output device is a navigational computer. The computer preferably comprises a housing, electronics, an input device, and an output device. Preferably, the output device is a display screen capable of displaying information to an occupant or occupants of the vehicle. In this embodiment, the navigational computer includes an electrical circuit that terminates in first and second electrical contacts. The electrical circuit is completed when the contacts are in electrical communication with each other. Preferably, one contact is disposed on the display screen and the other contact is disposed on the housing. The contacts are preferably arranged such that electrical communication between the two contacts is established only when the display screen is in the second position. That is, the electrical circuit is preferably completed only when the display screen is pointing toward the passenger seat of the vehicle. The electronics of the device are able to detect the electrical signal or lack thereof that flows through this circuit, and control the ability to input information into the device based upon this signal. If the circuit is complete, meaning that an occupant of the vehicle sitting in the driver's seat is unable to see information on the display screen, the electronics will enable the ability to input information into the device. On the other hand, if this circuit is not complete, the electronics will disable the ability to input information into the device.

In another preferred embodiment, mechanical means are utilized to detect the position of the display screen. In this embodiment, a switch is activated when the display screen is in the second position. Based on the activation status of this switch, the electronics control the ability to input information into the device.

The present invention also provides methods for restricting the ability of a vehicle occupant to input information into an input/output device mounted in a vehicle. The ability to input information into the input/output device is preferably controlled at least in part by the position of the output device relative to the driver's seat of the vehicle. Preferably, data input is controlled by a combination of the position of the output device and movement of the vehicle. This allows an occupant of the driver's seat of the vehicle to input information into the device if the vehicle is not moving, and also allows an occupant of a passenger seat of the vehicle to input information if the output device is not viewable by the occupant of the driver's seat, regardless of whether the vehicle is in motion. Alternatively, data input can be restricted to only when the display screen is in the second position. The method preferably comprises determining whether the output device is in a particular position relative to the driver's seat, disabling the input device if the output device is positioned such that an occupant of the driver's seat can view information on the output device, and enabling the input device if this occupant cannot view this information. The preferred method may further comprise determining whether the vehicle is in motion and enabling the input device when an occupant in the driver's seat can view information on the output device and the vehicle is not in motion.

DETAILED DESCRIPTION OF THE PREFERRED EMBODIMENTS OF THE INVENTION

The following description of preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
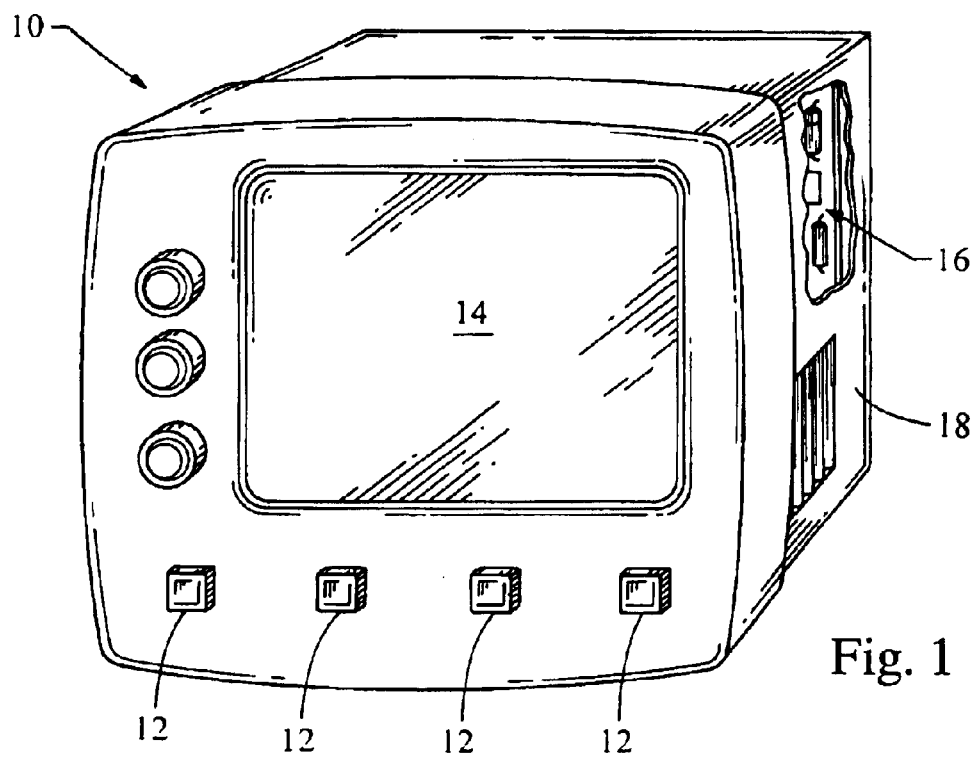
FIG. 1 is a perspective view of an input/output device incorporating a preferred embodiment of the present invention. The figure illustrates an output of the input/output device in a first position.

FIG. 1 illustrates an input/output device 10 that incorporates a preferred embodiment of the present invention. The input/output device 10 can be any device capable of receiving input from an occupant of the vehicle and displaying or otherwise outputting information. Examples of input/output devices suitable for use in the present invention include radios, integrated mobile phones, and integrated personal computers. The present invention is particularly well-suited for incorporation into navigational computers that allow an occupant of the vehicle to input an address or location to be mapped and displayed by the computer. Other examples of input/output devices include televisions, video display terminals, and entertainment systems.

The input/output device 10 includes input means that allow an occupant of the vehicle to input information into the device 10. As illustrated in the figure, typical input/output devices 10 include various buttons 12 that allow an occupant of the vehicle to input information, such as a destination address or location. Other suitable forms of input means include dials, switches, keyboards, joysticks, and computer mice. A common example of output means in input/output devices is a display screen 14. The display screen 14 is preferably an LCD screen, but may comprise any suitable type of display that is capable of projecting information.

Preferably, the input and output means of the input/output device 10 comprise structurally distinct devices, i.e., the input/output device 10 preferably includes an input device and an output device. Alternatively, the input and output means may be combined into a single device or component. For example, some modern input/output devices include touch sensitive display screens that allow the output portion of the device to also serve as the input device. Of course, a combination of these alternatives can also be employed.

The input/output device 10 includes electronics 16 appropriate for the type of device. For example, a navigational computer typically includes hardware suitable for reading stored data, such as CD-ROMs, as well as electronics for resolving the position of the vehicle relative to the earth, such as GPS receivers, etc. Furthermore, the electronics 16 are able to detect the position of the output 14. Preferably, as will be developed more fully below, electronics 16 detect the position of the output 14 by determining whether or not an electrical signal is flowing across a particular electrical circuit. Alternatively, the electronics 16 can detect the position of the output 14 by any suitable methods, including determining the position of a particular mechanical switch, the transmission of a particular stream of light, or other position detection methods or apparatuses.

Figure 3:
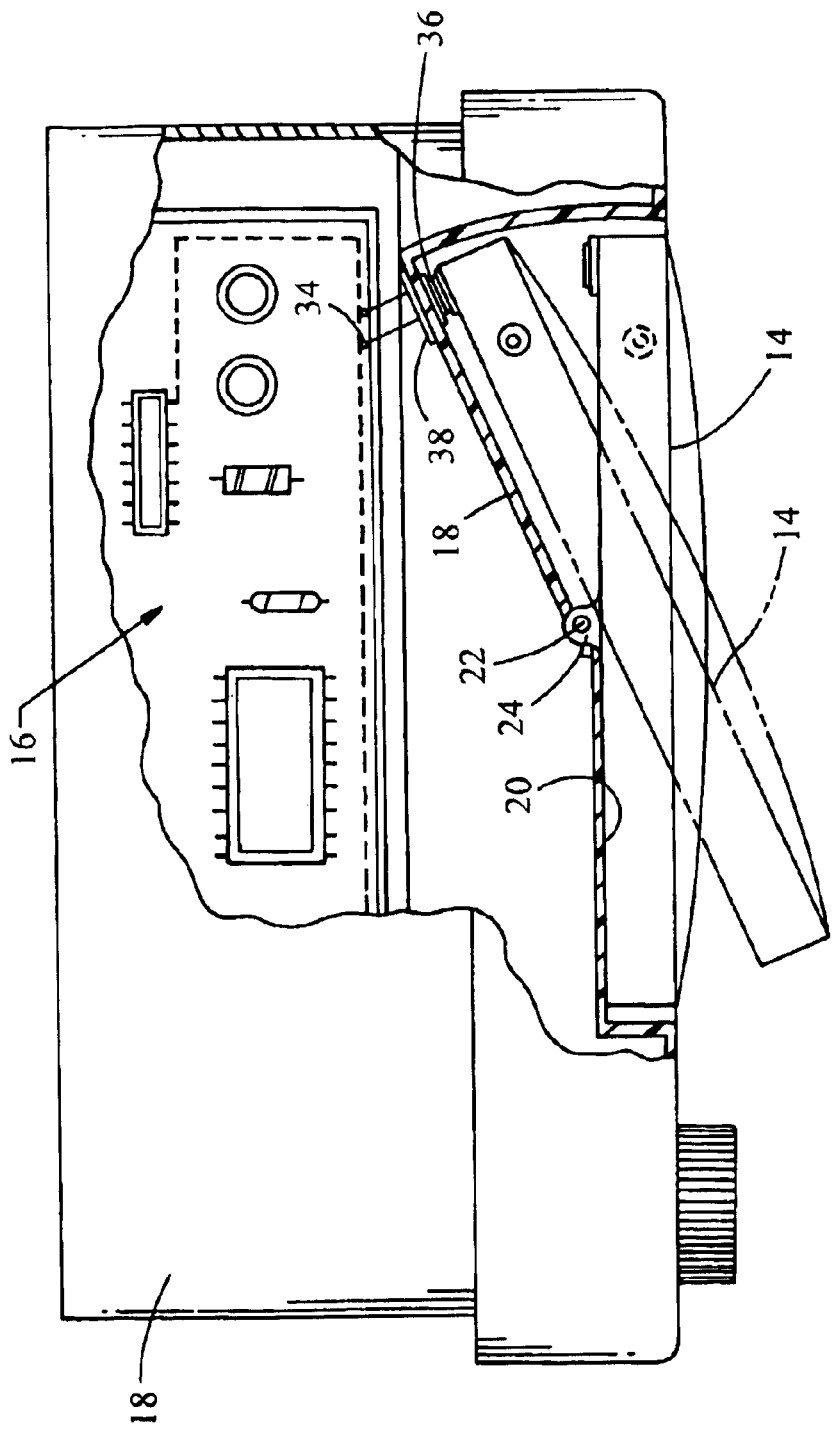
FIG. 3 is a partial cross-sectional view of an input/output device incorporating a preferred embodiment of the present invention. The figure illustrates both the first and second positions of the output device.

The input/output device 10 preferably includes a housing 18 that encases the componentry and electronics 16 of the device 10. As best illustrated in FIG. 3, the housing 18 preferably defines a recess 20 in which the output 14 is situated. The recess 20 is preferably large enough to the allow the output 14 to move between first and second positions. The solid lines in FIG. 3 illustrate the output 14 in a first position within the recess 20 while the phantom lines illustrate the output 14 in a second position within the recess. To facilitate this movement of the output 14 within the recess 20, the output 14 preferably includes a pin 22 that fits into an opening 24 defined by the housing 18. Preferably, a pin 22 is included on the upper and lower sides of the output 14, and complementary openings 24 are positioned in appropriate locations of the housing 18 near the recess 20. Alternatively, any arrangement of pins 22 and openings 24, or any other structural features, such as hinges, that allow the output 14 to move within the recess 20 between a first and second position can be employed. Also alternatively, the housing 18 need not define a recess 20 so long as the output 14 is able to move between a first and second position.

Figure 2A:
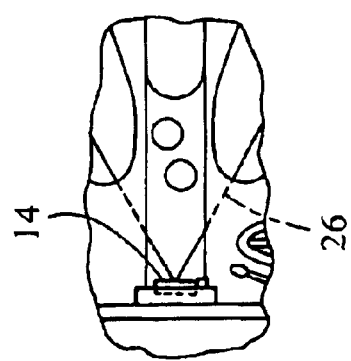
FIG. 2a is a top view of the input/output device of FIG. 2 and illustrates the output device in the first position.
Figure 2:
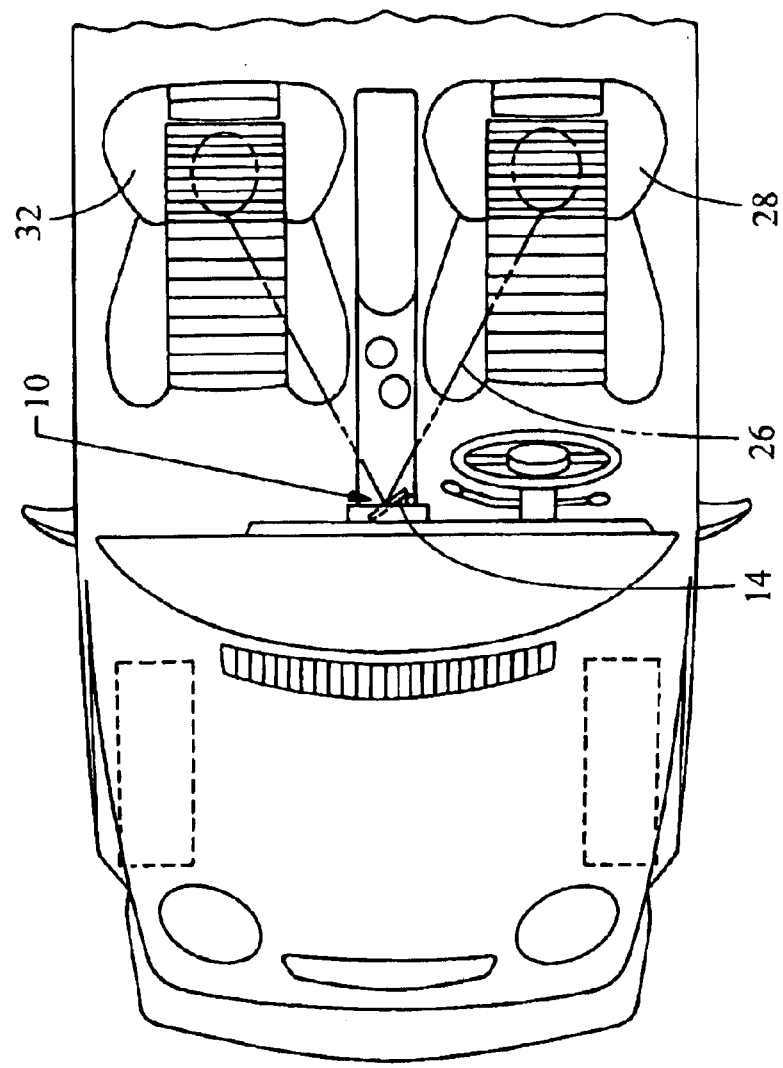
FIG. 2 is a top view of the interior compartment of a motor vehicle incorporating the present invention. The figure illustrates the second position of the output device relative to the driver and passenger seats and the fields of vision of occupants of these seats.

The first and second positions refer to orientations of the output 14 relative to the driver and passenger seats of the vehicle. FIG. 2 illustrates the relationship between the output 14 and the seats. In the second position, illustrated in FIG. 2, the output 14 is preferably oriented such that it does not lie within the zone of vision 26 of an occupant of the driver's seat 28. In this position, the occupant is not able to view information displayed on the output 14. In the first position, illustrated in FIG. 2a, the output 14 is preferably oriented such that it lies within the zone of vision 26 of an occupant of the driver's seat 28. Also preferable, the output 14 lies within the zone of vision 30 of an occupant of the passenger seat 32 when it is in the second position.

Due to the relationship between the output 14 and the seats 28, 32 of the vehicle within which the device 10 is installed, the exact orientation of the output 14 in the first and second positions will depend upon various factors, including the position of the device 10 relative to each of the seats 28, 32. Preferably, the first position is such that the plane of the output 14 is substantially parallel with the surface of the vehicle onto which the device 10 is mounted. For example, in a navigational computer mounted within the instrument panel of the vehicle, the first position is such that the plane of the output 14 is substantially parallel with the panel. Alternatively, of course, the first position can be any position that places the output within the zone of vision 26 of an occupant of the driver's seat of the vehicle. Also preferable, the second position is such that the output 14 lies outside of the zone of vision 26 of an occupant of the driver's seat and within the zone of vision 30 of an occupant of the passenger seat 32. That is, it is preferable that the second position place the output 14 within the view of an occupant of the passenger seat 32 and out of the view of an occupant of the driver's seat 28. Alternatively of course, the second position can be any position that places the output 14 outside of the zone of vision 26 of an occupant of the driver's seat. As shown in FIG. 2, the second position is preferably such that the lengthwise axis of the output is angled with respect to the surface of the vehicle onto which the device 10 is mounted.

FIG. 3 illustrates a first preferred embodiment of the present invention. As illustrated in the figure, the input/output device 10 includes an electrical circuit 34 that terminates in first 36 and second 38 electrical contacts. The electrical circuit 34 is complete when the first 36 and second 38 electrical contacts are in electrical communication with each other. When the circuit 34 is complete, an electrical signal can flow through the circuit 34. The presence or absence of this electrical signal can be used to determine if the electrical contacts 36, 38 are in communication with each other. Preferably, the electronics 16 utilize this electrical circuit 34 to determine the position of the output 14. As detailed above, the electronics 16 control the ability to input information into the input/output device 10. Preferably, in the absence of an electrical signal flowing through the circuit 34, the electronics 16 disable the input 12 such that no information can be input into the device 10. Also preferable, when an electrical signal flows across the circuit 34, such as when the output 14 is in the second position, the electronics 16 enable the input 12 such that information can be input into the device 10.

The contacts 36, 38 are preferably positioned such that the circuit 34 is complete only when the output 14 is in the second position. Accordingly, as illustrated in FIG. 3, the first electrical contact 36 is preferably disposed on the output 14 such that it is positioned toward the housing 18. The second electrical contact 38 is preferably positioned on the housing 18 such that electrical communication is established between the contacts 36, 38 when the output 14 is in the second position. Also preferable, the contacts 36, 38 are positioned such that the circuit is not complete, i.e., electrical communication is not established, when the output 14 is not in the second position.

Figure 4:
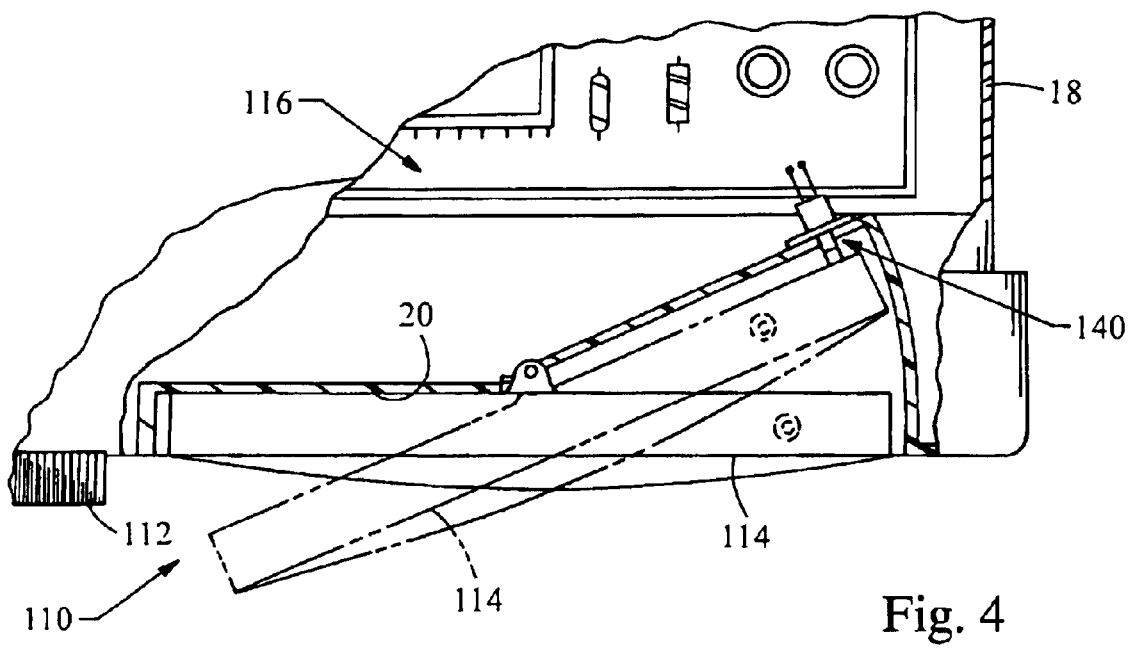
FIG. 4 is a partial cross-sectional view of an input/output device incorporating another preferred embodiment of the present invention. This figure also illustrates both the first and second positions of the output device.

FIG. 4 illustrates another preferred embodiment of the present invention. This embodiment is similar to the embodiment illustrated in the previous figures except as detailed below. Accordingly, similar reference numbers refer to similar components. In this embodiment, the output 114 activates a mechanical switch 140 when the output 114 is in the second position. The electronics 116 determine the presence of the output 114 in the second position by determining the activation status of the mechanical switch 140. Similar to the first preferred embodiment, the electronics 116 control the ability to input information into the input/output device 110. Preferably, the electronics 116 disable the input 112 when the switch 140 is not activated, i.e., when the output 114 is not in the second position.

It should be noted that any suitable method and or apparatus for determining the position of the output can be utilized in the present invention. A preferred example of such other methods and apparatuses is determining the transmission of a beam of light by using transmitters and/or receivers. This could be utilized by arranging a transmitter such that a beam of light is interrupted when the output is in the second position. This interruption of the light beam could then be utilized by the electronics of the input/output device to enable or disable the input device as appropriate.

The present invention also provides a method of restricting the ability to input information into an input/output device mounted within the vehicle. The method preferably comprises determining if the output of the device lies within the zone of vision of an occupant of the driver's seat of the vehicle, disabling the input of the device if the output is within the zone of vision of an occupant of the driver's seat, and enabling the input of the device if the output is not within the zone of vision of an occupant of the driver's seat. The method may further comprise determining if the vehicle is in motion and enabling the input of the device if the output lies within the zone of vision of an occupant of the driver's seat and the vehicle is not in motion.

The determination of whether the output of the device lies within the zone of vision of an occupant of the driver's seat of the vehicle can be performed by any technique suitable for determining the position of the output relative to the driver and/or passenger seat of the vehicle. Preferably, this determination is accomplished as detailed above for the preferred embodiments of the apparatus of the present invention.

The enabling and disabling of the input of the device is preferably accomplished by the electronics of the device. Preferably, when disabling of the input is appropriate, the electronics stop processing signals from the input. Thus, when the input is disabled, the functionality in the input is not available to an occupant. Alternatively, disabling of the input may further include displaying information on the output regarding the disabled status of the input. For example, when the input is disabled, the output can display a message indicating that the input is disabled. When enabling of the input is appropriate, the electronics preferably begin processing signals from the input.

The determination of whether the vehicle is in motion can be accomplished by processing signals sent from the axles of the vehicle, the speedometer, or any other suitable vehicle component that indicates movement of the vehicle.

As used herein, the term "zone of vision" refers to the images perceivable by a typically-sized occupant situated upright in a particular vehicle seat.

The foregoing disclosure includes the best mode devised by the inventors for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

We claim:

1. An input/output device for mounting in a vehicle having a driver seat and a passenger seat, comprising:
    a housing;
    an input device;
    an output device for displaying information to one or more occupants of said vehicle, the output device being adapted to move between first and second positions, the first position being such that information displayed on the output device is within the zone of vision of an occupant of said driver seat, the second position being such that information displayed on the output device is not within the zone of vision of an occupant of said driver seat;
    an electrical circuit terminating in first and second electrical contacts, the circuit being complete when the first electrical contact is in electrical communication with the second electrical contact the first electrical contact disposed on the output device such that the electrical circuit is complete when the output device is in the second position; and
    electronics adapted to disable the input device when the output device is not in the second position.

2. An input/output device according to claim 1, wherein the second electrical contact is disposed on the housing.

3. An input/output device according to claim 1, wherein the housing defines a recess having a perimeter and the output device moves between the first and second positions substantially within the recess.

4. An input/output according to claim 3, wherein the output device has a pivot pin and the perimeter of the recess defines an opening that receives the pin such that the output device moves between the first and second positions substantially within the recess.

5. An input/output device according to claim 4, wherein the output device has a second pivot pin and the perimeter of the recess defines a second opening that receives the second pin.

6. An input/output device according to claim 1, wherein the input device comprises a plurality of buttons adapted to allow an occupant of said vehicle to enter information into said input/output device by depressing one or more of the buttons.

7. An input/output device according to claim 1, wherein the output device comprises a display screen.

8. An input/output device according to claim 7, wherein the input device comprises on-screen controls selectively displayed on the display screen.

9. An input/output device of claim 1, wherein the second position is such that information displayed on the output device is within the zone of vision of an occupant of said passenger seat.

10. An input/output device mounted in a vehicle having a driver seat and a passenger seat, comprising:

a housing;

electronics;

a switch having activated and inactivated positions;

an input device; and an output device for displaying information to one or more occupants of said vehicle, the output device being adapted to move between first and second positions, the first position being such that information displayed on the output device is within the zone of vision of an occupant of said driver seat, the second position being such that information displayed on the output device is not within the zone of vision of an occupant at said driver seat;

wherein the switch is disposed on the housing such that the output device moves the switch into the activated position when the output device moves from the first position to the second position, and wherein the electronics disable the input device when the switch is not in the activated position.

11. An input/output device according to claim 10, wherein the second position is such that information displayed on the output device is within the zone of vision of an occupant of said passenger seat.

12. An input/output device mounted in a vehicle having a driver seat and a passenger seat, comprising:

a housing defining a recess;

an input device;

an output device for displaying information to one or more occupants of said vehicle, the output device being adapted to move between first and second positions substantially within the recess, the first position being such that information dissolved on the output device is within the zone of vision of an occupant of said driver seat, the second position being such that information displayed on the output device is not within the zone of vision of an occupant of said driver seat;

means for detecting the presence of the output device in the second position; and means for disabling the input device when the output device is not in the second position and enabling the input device only when the output device is in the second position.

13. An input/output device according to claim 12, wherein the second position is such that information displayed on the output device is within the zone of vision of an occupant of said passenger seat.

14. A method of restricting input into an input/output device mounted within a vehicle having driver and passenger seats, said input/output device having a housing defining a recess, an input device and an output device adapted to move between first and second positions substantially within the recess, the method comprising:

determining whether information displayed by the output device is within a zone of vision of an occupant of said driver seat;

disabling said input device if the information is within the zone of vision of an occupant of said driver seat; and enabling said input device if the information is not within the zone of vision of an occupant of said driver seat.

15. The method in accordance with claim 14, further comprising determining if said vehicle is in motion and enabling said input device if said vehicle is not in motion.

* * * * *

UNITED STATES PATENT AND TRADEMARK OFFICE
CERTIFICATE OF CORRECTION

PATENT NO.     : 6,717,287 B2
DATED          : April 6, 2004
INVENTOR(S)    : Steven C. Tengler et al.

It is certified that error appears in the above-identified patent and that said Letters Patent is hereby corrected as shown below:

Column 6,
Line 42, immediately after "electrical contact" insert -- , -- (comma).

Column 7,
Line 24, after "an occupant" delete "at" and substitute -- of -- in its place.

Column 8,
Line 6, delete "dissolved" and substitute -- displayed -- in its place.

Signed and Sealed this

Thirtieth Day of November, 2004

JON W. DUDAS
*Director of the United States Patent and Trademark Office*